United States Patent [19]

Suarez, Jr. et al.

[11] 4,407,293
[45] Oct. 4, 1983

[54] ULTRASOUND IMAGING APPARATUS FOR PROVIDING SIMULTANEOUS B-SCAN AND DOPPLER DATA

[75] Inventors: Joe R. Suarez, Jr., Fremont; Henry L. Schwartz, Los Gatos; Anthony J. Rossetti, San Jose; Paul D. Corl, Stanford, all of Calif.

[73] Assignee: Diasonics, Inc., Milpitas, Calif.

[21] Appl. No.: 257,506

[22] Filed: Apr. 24, 1981

[51] Int. Cl.³ .............................................. A61B 5/02
[52] U.S. Cl. ..................................... 128/660; 128/663
[58] Field of Search ...................... 128/660, 662, 663; 73/625, 626

[56] References Cited

U.S. PATENT DOCUMENTS

| | | | |
|---|---|---|---|
| 4,062,237 | 12/1977 | Fox | 128/663 |
| 4,097,835 | 6/1978 | Green | 128/663 |
| 4,141,347 | 2/1979 | Green et al. | 128/663 |
| 4,313,444 | 2/1982 | Glenn | 128/663 |
| 4,318,413 | 3/1982 | Iinuma et al. | 128/663 |

FOREIGN PATENT DOCUMENTS 1573842 8/1980 United Kingdom .

OTHER PUBLICATIONS

Roelandt, J. et al., "Ultrasonic Real Time Imaging with a Hand-Held Scanner Ultrasound in Medicine and Biology", vol. 4, pp. 93-97.

Primary Examiner—Richard J. Apley
Assistant Examiner—George Yanulis
Attorney, Agent, or Firm—Blakely, Sokoloff, Taylor & Zafman

[57] ABSTRACT

An ultrasound imaging apparatus is described. The hand-held device includes a first oscillating transducer for providing a B-scan display and an offset second transducer which is manually positioned for providing Doppler data. The transducer pulses are interlaced and Doppler transmissions are inhibited to permit B-scan transmissions. However, circuits provide a continuous signal representing a Doppler signal when the Doppler transmissions are inhibited.

21 Claims, 13 Drawing Figures

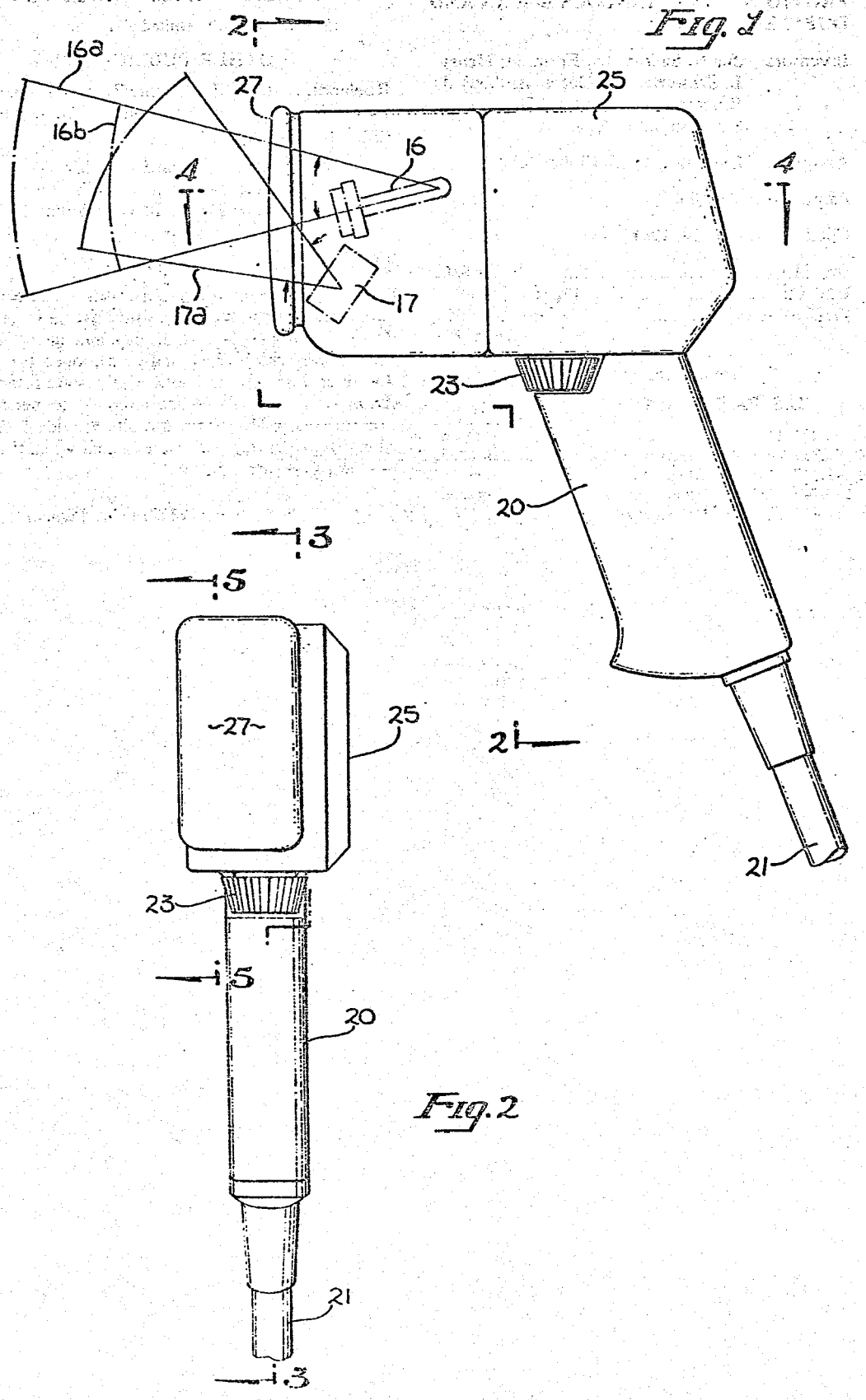

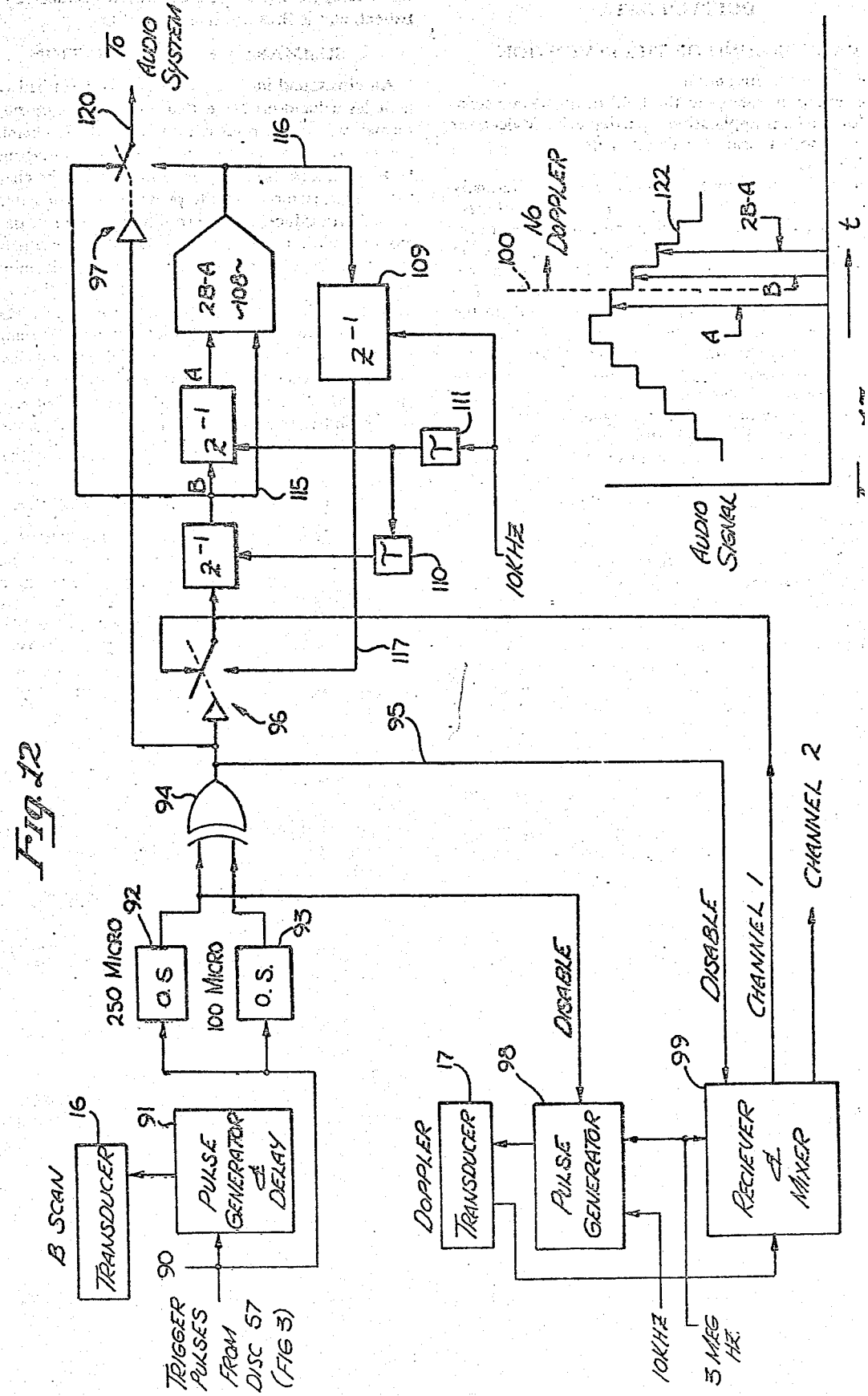

ULTRASOUND IMAGING APPARATUS FOR PROVIDING SIMULTANEOUS B-SCAN AND DOPPLER DATA

BACKGROUND OF THE INVENTION

1. Field of the Invention

The invention relates to the field of ultrasonic scanning for medical applications, particularly devices for providing both B-scan and Doppler data.

2. Prior Art

Numerous ultrasound scanners are commercially available for diagnostic procedures. In one class of these scanners, a B-scan display is presented to the operator. The operator selects a point with a cursor in this B-scan display. An ultrasound beam is directed to the point and the echoes processed to obtain the Doppler shift. The major application for these systems is to evaluate the effects of arteriosclerosis in the peripheral vascular system, primarily carotid, femoral and popliteal arteries. Possible areas containing plaque within the lumen of vessels can generally be identified in the B-scan display, and then with use of the Doppler signal, the "rushing" sound of the blood through these obstructed areas is vividly heard. Severe obstructions cause larger accelerations along with turbulent flow. This turbulent flow includes reverse flow which is also monitored.

In one prior art system, a pluraltiy of transducers are mounted about a common axis with their beams extending radially from the axis. As the transducers are rotated past an ultrasound window which is in contact with the body, data for a B-scan display is obtained. When the operator finds an area within the B-scan requiring a Doppler examination, the rotation of the transducers is stopped. Then a single transducer is aimed at the area of interest and the echoes from this transducer processed to sense the Doppler shift. There are several problems with this prior art device. First, during the time of the Doppler examination, the operator is not certain of the precise point from which the Doppler returns are received. The reason for this is that the B-scan data is not simultaneous with the Doppler data (i.e., the rotation of the transducers is stopped during the Doppler mode). Also since the same transducers are used both for the B-scan and Doppler data, the frequency of the transducers cannot be optimized for each mode. Another problem encountered with this prior art device is that when a transducer is in a normal position relative to the body there is no Doppler shift if the Doppler beam is perpendicular to the blood flow direction.

As will be seen, the present invention provides both simultaneous B-scan and Doppler data with separate transducers. The Doppler transducer of the present invention is off to the side of the B-scan transducer, therefore assuring a better Doppler return.

In another prior art imaging system, the above-mentioned rotating transducers are used for a B-scan display and a separate transducer for Doppler data. With the configuration of this device, precise alignment of the Doppler beam within the field of view of the B-scan beam is not assured because of the mounting employed. Morevoer, simultaneous operation as in the present invention is not provided.

In still another prior art system, a single, split transducer is employed. (That is, each transducer half is of a semicircular shape). Each of the transducer halves moves independently, one providing a B-scan display and the other, Doppler data. With this system, there is limited flexibility in positioning the transducers to provide both B-scan and Doppler data. Also, this system has a long fluid path between the transducer and the patient, and is thus not hand-holdable.

SUMMARY OF THE INVENTION

An ultrasound imaging apparatus is described which includes a hand-holdable housing. A fluid chamber is formed within the housing; one face of the chamber is defined by a flexible ultrasound boot for contacting the body. A first transducer is mounted within the chamber for oscillatory movement to provide a B-scan display. A second transducer for providing Doppler data is mounted within the fluid chamber off to the side of the first transducer. This second transducer is mounted such that its beam falls within the field of view (plane defined by the beam) of the first transducer. Manual adjustment means are provided for moving the angular position of the second transducer, and hence its beam is moveable within the field of view of the first transducer. Simultaneous (interlaced) operation of the first and second transducers occurs such that a continuous updated B-scan display is viewable while operating the second transducer.

BRIEF DESCRIPTION OF THE DRAWINGS

FIG. 1 is a side view of the invented imaging apparatus illustrating the overall shape of the housing and the fields of view of the B-scan transducer and the Doppler transducer.

FIG. 2 is a front view of the apparatus of FIG. 1, generally taken through section line 2—2 of FIG. 1.

FIG. 12 is an alternate embodiment of the circuit of FIG. 10 which includes a predictor circuit.

FIG. 13 is a graph used to describe the operation of the circuit of FIG. 12.

DETAILED DESCRIPTION OF THE INVENTION

An ultrasound imaging apparatus which includes a hand-holdable "head" and related circuitry is described. In the following description, numerous specific details such as specific frequencies, pulse rates, are set forth in order to provide a thorough understanding of the present invention. It will be obvious to one skilled in the art that the present invention may be practiced without these specific details. In other instances, well-known devices including signal processing circuits, are not shown in detail in order not to obscure the present invention in unnecessary detail.

The described imaging head and circuitry provide simultaneously a B-scan display and Doppler data. (The Doppler data is presented in an audio form, however, it is also processed, for example, by using a Fast Fourier transform.) In the following description, references are made to the "B-scan transducer" and "Doppler transducer". It will be appreciated that "B-scan" and "Doppler" do not describe particular transducer-types, but rather the use to which echoes received by these transducers are placed. However, it will be helpful for purposes of description to refer to them as "B-scan transducer" and "Doppler transducer".

In FIGS. 1 through 9, an imaging head is described which includes both the B-scan transducer and Doppler transducer. The signals, particularly from the B-scan transducer, are processed for display generally in the manner described in U.S. Pat. No. 4,241,412. There are several differences, however, in the electrical processing. First, the echoes from each "vector" of the B-scan transducer are stored in predetermined locations in memory, that is, there is a one-to-one mapping between the angular location of the B-scan transducer and positions in memory. The memory addresses for storing the data received from the B-scan transducer are determined directly from the encoding disc which will be described. These addresses are used to directly look-up (in a ROM) both tangent and secant functions. Thus, the need to calculate the tangent and secant as in the above-described patent is not required. Also, a "look-up table" for determining the refraction is not used with the present invention. As will be discussed, the angle between the transducers and the interface with the body is not known because a flexible interface is used.

Figure 10:
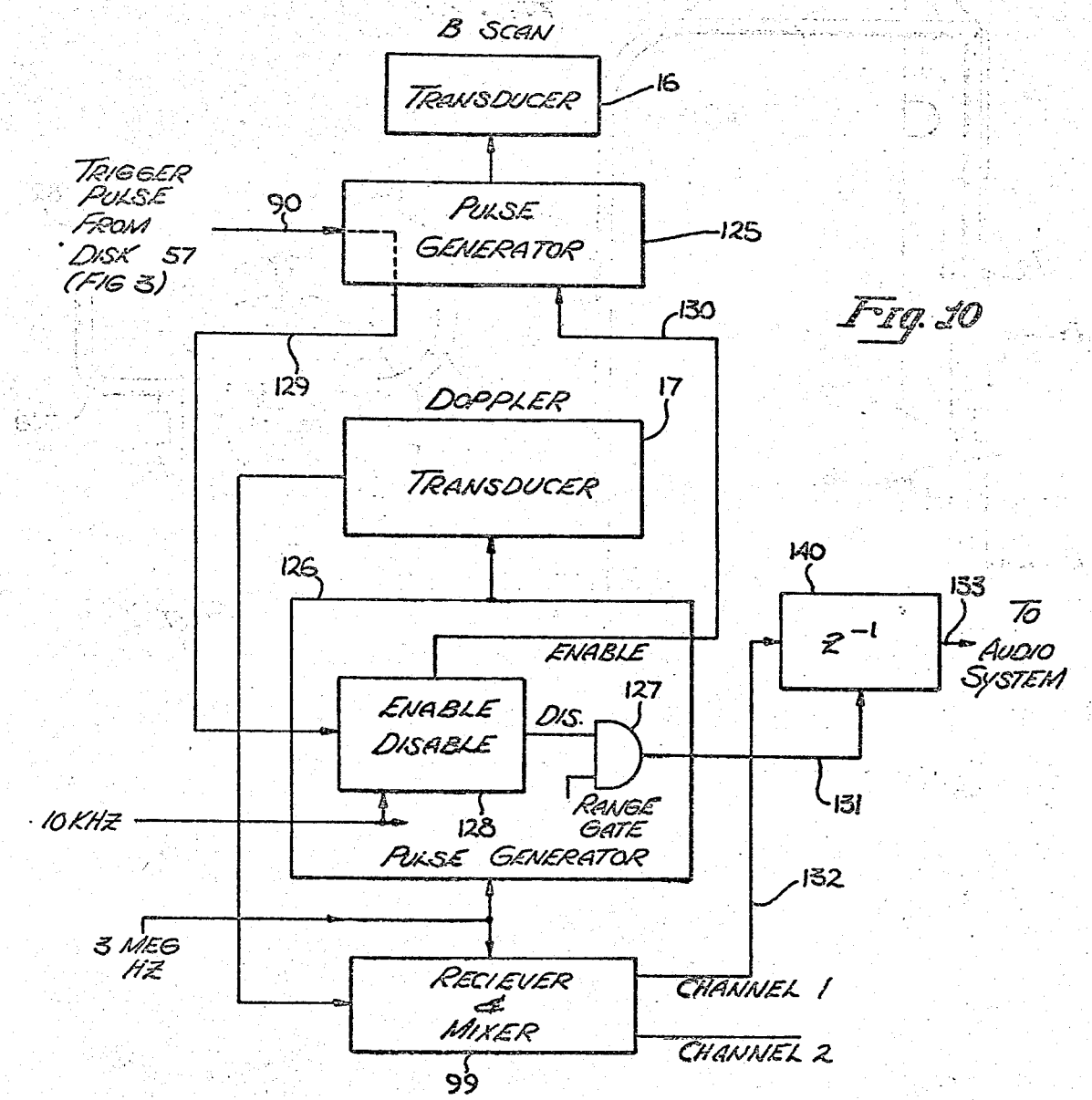
FIG. 10 is a block diagram of a circuit used to provide continuous B-scan and Doppler data.
Figure 11:
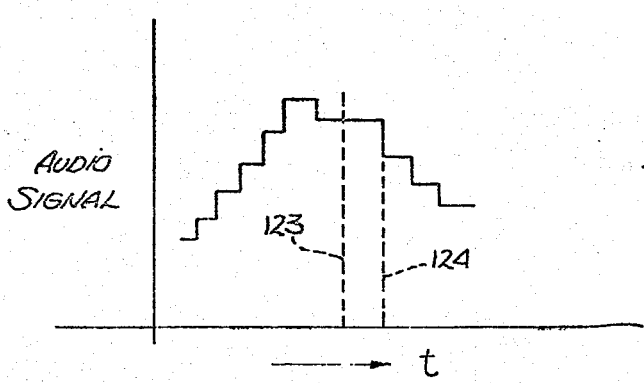
FIG. 11 is a graph used to describe the operation of the circuit of FIG. 10.

The other aspects of the electrical processing of the signals from the transducers which are significantly different than the prior art are described in conjunction with FIGS. 10 and 11. This involves the circuit which provides a continuous audio signal (of Doppler data) even though the Doppler transducer is sometimes disabled to permit continuous updating of the B-scan display. It is this circuit which allows simultaneous (from the user's standpoint) B-scan and Doppler data when the beams are interlaced in time.

Referring first to FIGS. 1 and 2, the imaging head of the present invention is a hand-held device which includes the hand grip 20 and housing 25. The flexible membrane, or boot, 27 is placed against the patient for viewing, permitting beams from the transducers 16 and 17 to pass through the short fluid path between these transducers and the boot 27. In the presently preferred embodiment, some pre-amplification of signals received by these transducers is performed by circuitry on a printed circuit board contained within the handle 20 (see circuit board 68 of FIG. 3). Electrical coupling between the head and the electrical processing equipment and displays is made through the cable 21.

The B-scan transducer 16 moves in oscillatory motion to provide a field of view generally indicated by field 16a. The Doppler transducer 17 which is offset from the transducer 16 provides a beam which is coplanar with the field of view 16a. The angular position of transducer 17 is manually adjusted through the finger wheel 23 to provide a field of view 17a.

In the presently preferred embodiment, when the B-scan transducer is operated without the Doppler transducer, the field of view is deeper as indicated by 16a. During the simultaneous B-scan and Doppler mode, the depth of the field of view from the B-scan transducer is reduced to the field generally shown by 16b. Doppler echoes from virtually any point within the field of view 16b can be sensed by setting the angle of transducer 17 and by adjusting the range gate for the returns from this transducer. (A range gate adjustment is not included on the head, but rather on a separate keypad.)

The B-scan transducer 16 is an ordinary commercially available transducer operating at a frequency of approximately 7.5 MHz. Note that since the transducer oscillates, if its pulse rate were constant, more pulses would occur at the ends of the oscillation and fewer at the center. To avoid this, the pulse rate is distributed in a sinusoidal fashion as will be described to provide uniform spacing of the vectors or beams. The average pulse rate is approximately 2.5 KHz during the B-scan only mode. The Doppler transducer 17 operates at a precisely controlled frequency of approximately 3 MHz and a pulse rate of 10 KHz. As will be described, some pulses from this transducer are inhibited to allow a continuous update of the B-scan display. A commercially available ultrasound transducer is used for Doppler transducer 17.

The head housing is comprised of three injection molded glass reinforced polycarbonate (Lexan) members. The lower housing shell serves as the scan head chassis and one-half of a fluid chamber. The middle housing shell completes the fluid chamber and contains the transducer shafts, dynamic seals and a fluid filling port. The upper housing shell serves as a cover, its removal allows access to all scan head mechanisms and electronics for servicing and adjustment. The three pieces of the housing fit together to provide a watertight seal so that the head may be safely immersed for cleaning if required.

The fluid chamber 33 (FIG. 4) is defined between the opposite, parallel walls 37 and 38. The rear wall 32 of this vessel is best seen in FIG. 5. One end of the vessel is defined by the rubber boot 27. A fill port and plug 30 are provided to allow the vessel to be filled after assembly of the imaging head. Both the transducers 16 and 17 are mounted within the fluid vessel such that their beams pass through the boot 27.

The boot 27 is a silicone rubber membrane embedded with iron oxide. It has a density of approximately 1.4 to 1.5. The acoustical impedance of this membrane is approximately 1.5, the nominal value of the acoustical impedance for human tissue. The vessel 33 is filled with a mixture comprising by volume of 80 parts of Jeffox WL-1400, 40 parts of Jeffox WL-55 and 15 parts water, or a mixture of WL-1400 and glycerine.

It should be noted that the membrane, or boot, 27 is flexible, and its shape will change when placed in contact with a patient. This means that the angle o incidence of the ultrasound leaving and returning to the imaging head is not fixed. For this reason it is important to have the velocity of the ultrasound in the fluid contained within vessel 33 match as nearly as possible the velocity of the fluid in human tissue. It has been found that the above mixture provides such characteristics.

Both the transducers 16 and 17 as may be seen in FIGS. 1, 3, 4 and 9 are mounted such that their beams are coplanar. Both transducers are mounted for movement between the walls 37 and 38 which walls assure coplanar movement of both transducers.

Figure 3:
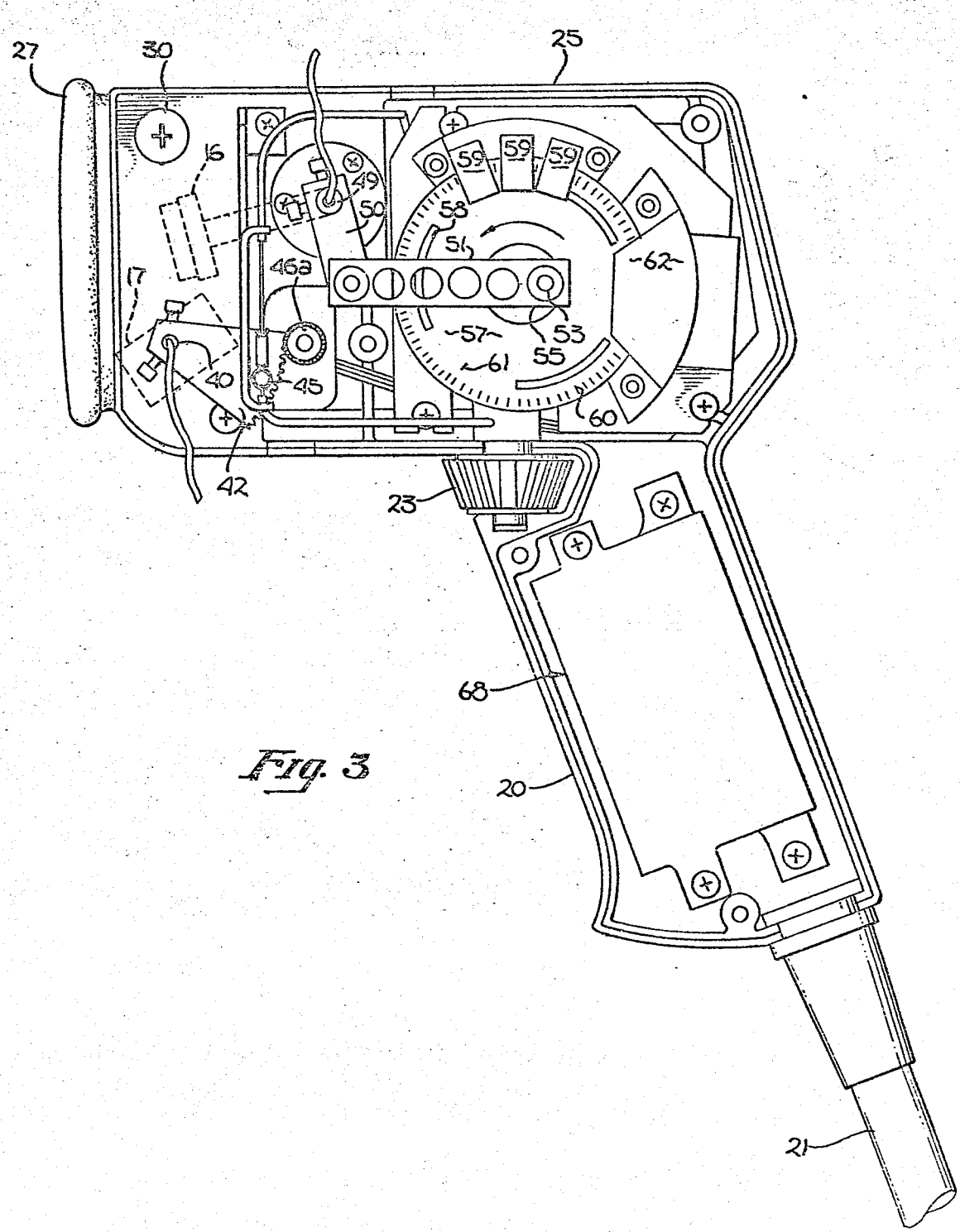
FIG. 3 is a cross-sectional side view of the invented apparatus taken through section line 3—3 of FIG. 2.
Figure 9:
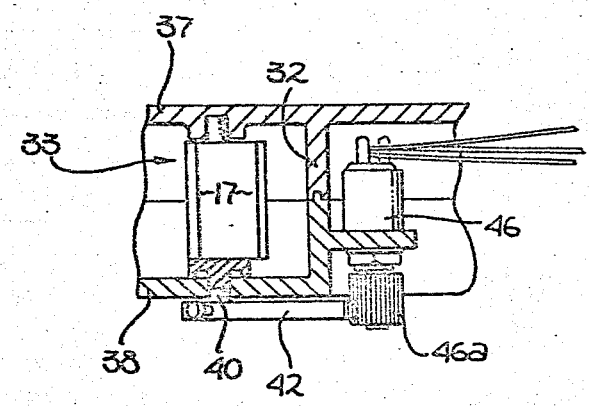
FIG. 9 is a partial, cross-sectional top view of the invented apparatus, used to illustrate the mounting of the Doppler transducer within the fluid chamber and it coupling to a position potentiometer. This view i generally taken through section line 9—9 of FIG. 5.

Transducer 16 is mounted on a shaft 49, one end of shaft 49 is secured to wall 37 in a bearing. The other end of the shaft passes through the dynamic seal 34 and terminates outside the vessel 33 as a crank shaft 49. The electrical lines needed to communicate with the transducer 16 are brought out through the center of the shaft 49 as best shown in FIGS. 3 and 5. (Note the lines are shown extending beyond the housing 25 in FIG. 3 only for purposes of illustration; normally the lines are routed within the housing to the printed circuit board 68 or cable 21). Referring briefly to FIG. 9, the transducer 17 also is mounted between walls 37 and 38 on studs which allow angular movement of this transducer in the plane of movement of transducer 16. A stud 40 passes through a dynamic seal (not illustrated) at wall 38. The stud 40 is secured in the gear sector 42 (see FIG. 5). As will be described in greater detail, the gear sector 42 is driven from a pin 45. The teeth on the gear sector 42 cooperatively engage gear 46a; this gear drives the potentiometer 46. The output of the potentiometer provides a signal indicating the angular position of the Doppler transducer. (This output, along with a range gate setting, positions a cursor on the B-scan display.)

Figure 4:
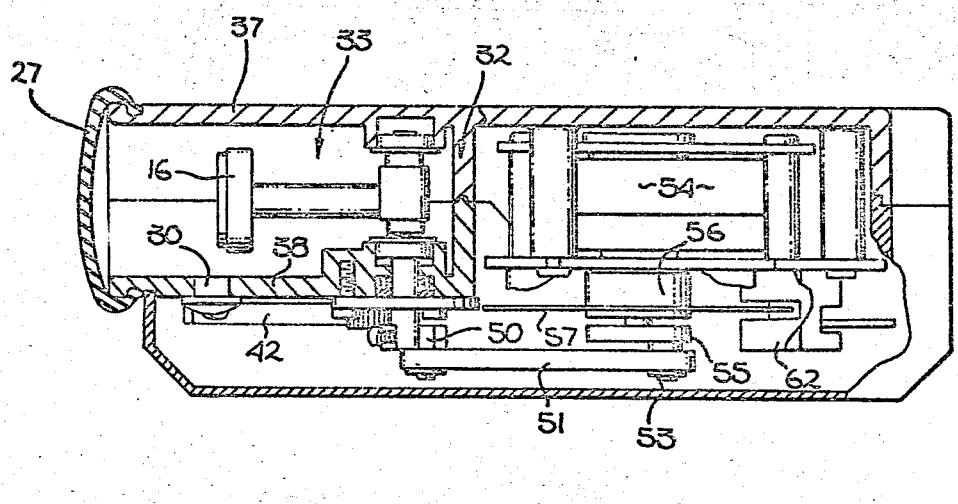
FIG. 4 is a cross-sectional top view of the invented apparatus generally taken through section line 4—4 of FIG. 1.
Figure 5:
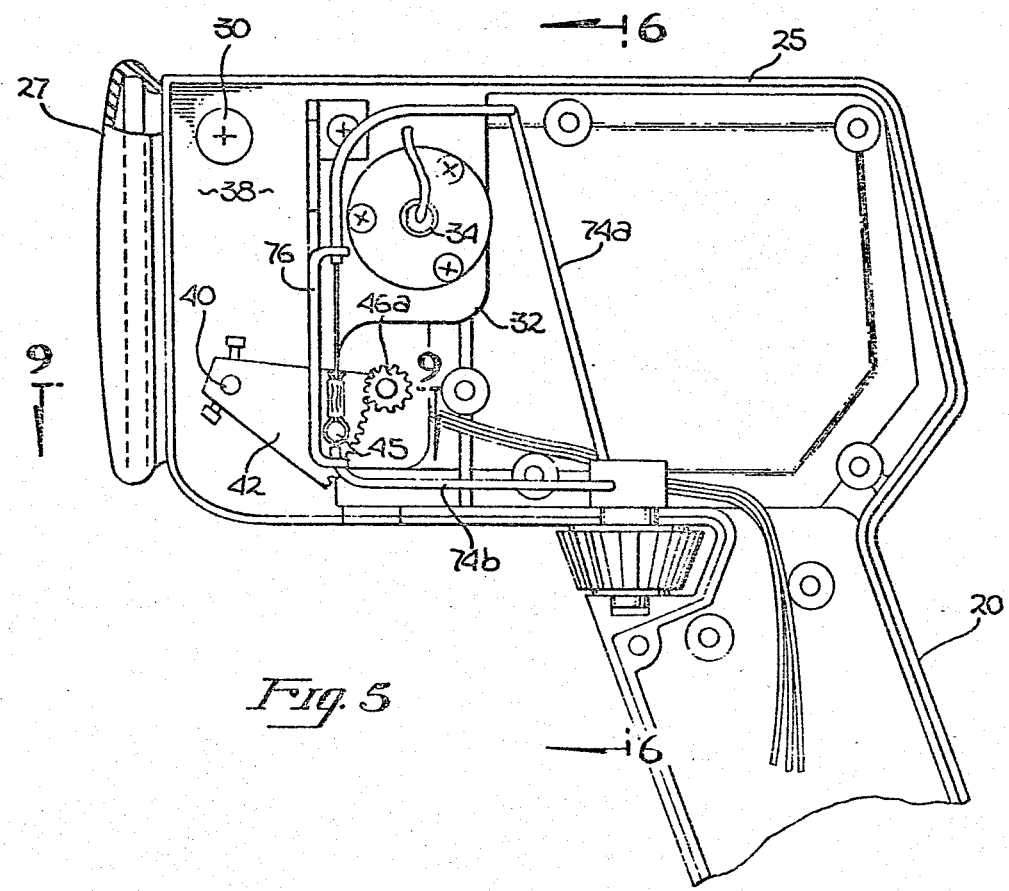
FIG. 5 is another cross-sectional side view generally taken through section line 5—5 of FIG. 2 (the motor is not shown in this view in order that the mechanisms for positioning the Doppler transducer is better revealed).

Primarily referring to FIGS. 3 and 4, the shaft 49 of transducer 16 is secured to one end of a crank arm 50. The other end of arm 50 is coupled to one end of the drive link 51. The other end of drive link 51 is eccentrically connected to the wheel 55. Wheel 55 is directly driven by the motor 54 (FIG. 4). It is apparent that as the motor 54 drives the wheel 55, the drive link 51 will move in a reciprocating fashion which in turn will cause the transducer 16 to oscillate on shaft 49.

An encoding disc 57 is mounted on wheel 56 on the shaft of motor 54. A plurality of slots are cut through the disc 57 to provide position information on the transducer 16. An inner track consisting of three elongated curved slots 58 is used for developing commutation signals for the motor 54. The outer track 60 consists of a plurality of openings distributed in a sinusoidal fashion to provide triggering signals for transducer 16. A single slot 61 disposed between the inner and outer tracks is also used.

The light from light emitting diodes disposed beneath the disc 57 (not illustrated) are detected by detectors 59 and detector 62. The light passing through the slots 58 are detected by detectors 59; the output of these detectors are used by motor commutator choppers. The motor 54 is a three phase, six pole DC brushless motor which is operated as a synchronous motor. During modes without Doppler (B-scan only), it runs at approximately 10 revolutions per second (20 frames per second) and in Doppler modes, it runs at two revolutions per second (4 frames per second).

Light from the slot 61 is detected by detector 62 and this detector provides a reference signal once per revolution of disc 57 which is used to give the disc position (position of transducer 16).

The slots of the outer track 60 are distributed, as mentioned, in a sinusoidal fashion around the disc and light passing through these slots 60 is detected by detector 62. The output of this detector is used to provide transmit request signals for triggering transducer 16. Because of the sinusoidal distribution of the slots 60, ultrasound pulses from the transducer 16 are uniformly spaced (spacially) rather than being uniformly spaced in time. The pulses are transmitted at a higher rate when the transducer is in the central portion of its swing since it is moving at a faster angular rate. Pulses are transmitted at a slower rate when the transducer is in the end portions of its swing. (In the presently preferred embodiment, transducer 16 has a total angular swing of approximately 28 degrees, +14 degrees from a line normal to the boot 27.)

The finger wheel 23 (FIG. 3) is mechanically coupled by a wire rope to the pin 45. Movement of the finger wheel 23 causes the pin 45 to move the sector gear 42, thereby moving the angular position of the transducer 17. In the presently preferred embodiment, the transducer moves through an angle of approximately 45 degrees. (If a line is drawn from the center of transducer 17 normal to the boot 27, transducer 17 moves between 10 degrees and 55 degrees with respect to this line.)

Figure 6:
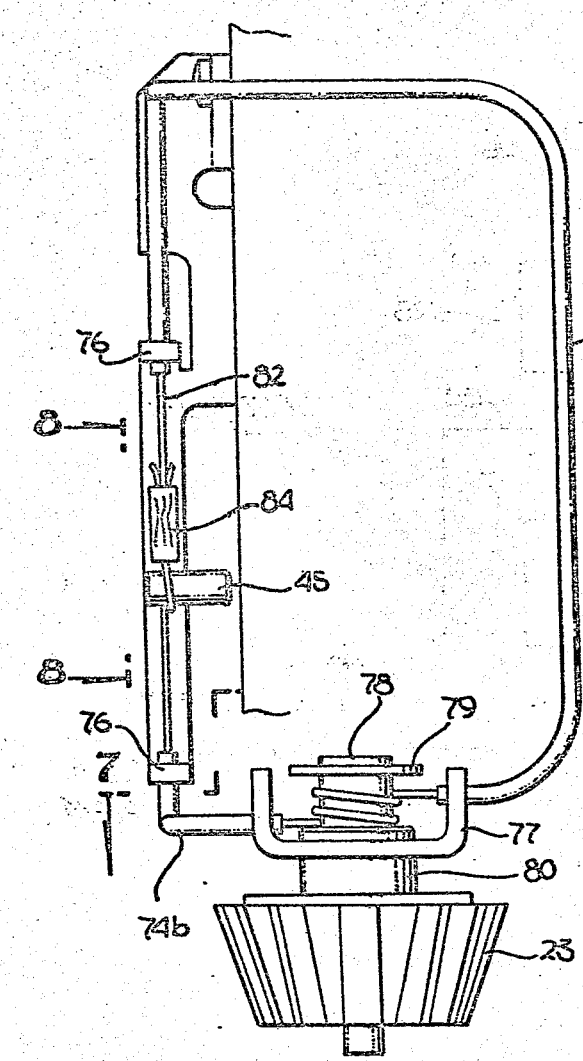
FIG. 6 is a plan view of the manual positioning mechanism used to position the Doppler transducer generally taken through section line 6—6 of FIG. 5.

Referring now to FIGS. 5, 6, 7, and 8, a unique positioning mechanism is employed for changing the angular position of the transducer 17. First, as best seen in FIGS. 5 and 6, this mechanism is secured to the imaging head by a C-shaped bracket 76 and a U-shaped bracket 77. Metal guide tube 74a is secured to one end of bracket 77 and then the other end of tube 74a is secured to one end of the bracket 76. The other end of bracket 76 receives one end of the tube 74b; the other end of tube 74b is secured to the other end of the bracket 77. The tubes 74a and 74b are stainless steel tubes welded to the brackets, and which form a continuous rigid frame member with the brackets.

Figure 7:
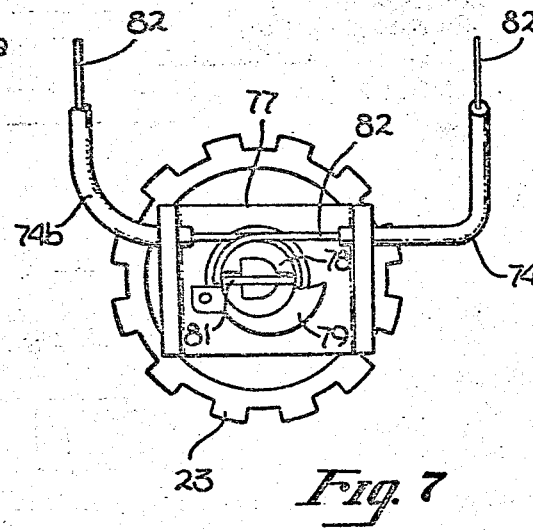
FIG. 7 is a cross-sectional rear view of the mechanism of FIG. 6 generally taken through section line 7—7 of FIG. 6.

As best seen in FIGS. 6 and 7, the knob 23 is mounted within bracket 77 on bushing 80. The wire rope 82 passes through the tubes and through a slot 81 defined at the capstan end 78 of the knob 23. Two turns of the wire rope are wound around capstan end 78; these turns are prevented from sliding off the capstan by the snap ring 79.

Figure 8:
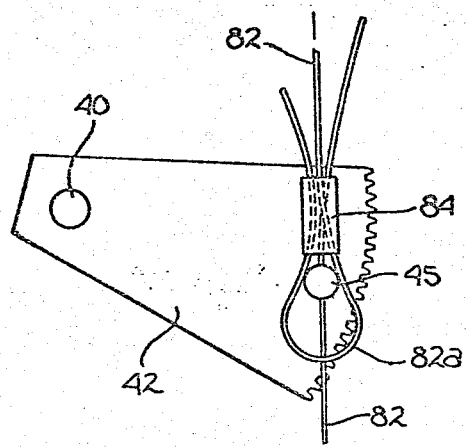
FIG. 8 is a view of the gear segment used to drive the Doppler transducer and this segment's coupling with the mechanism of FIGS. 6 and 7. This view is generally taken through section line 8—8 of FIG. 6.

The free ends of the wire rope 82 as best shown in FIG. 8 are passed through the sleeve 84; one end of the rope defines a loop 82a which encircles the pin 45. The loop 82a is drawn tightly around pin 45 (it is shown loose for purpose of illustration in FIG. 8). The wire rope 82 is then tensioned, and the sleeve 84 crimped, to secure the wire rope.

It is apparent that as the knob 23 is turned the wire rope will move within the tubes 74a and 74b and drive pin 45 which in turn changes the angular position of the transducer 17.

An important advantage to the above-described mechanism is that it may be totally assembled and tensioned prior to the time that it is installed within the imaging head. The knob 23 is installed within the brackets 77, and the wire rope tensioned about the pin 45, all prior to the time of installation within the head. This allows convenient, easy tensioning of the wire rope. Once installed within the head, the entire mechanism is secured by the brackets and the pin 45 urged into the gear segment 42. Note that because the tubing is securely welded to the brackets, the tension in the cable does not change during installation.

There are several modes in which the head is used. During a B-scan only mode (no Doppler) 20 frames per second of B-scan data is provided by the transducer 16. During the simultaneous B-scan and Doppler modes, four frames per second of B-scan data is provided along with the Doppler data. The maximum B-scan pulse rate for this simultaneous mode is 800 Hz. The disc 57 and the Doppler pulses are asynchronous, thus pulses (or request for pulses) from both transducers could occur at or near the same time. This, of course, is undesirable since, among other things, a transmission from one transducer may be sensed as an echo, in the other transducer. To prevent this from happening, pulse interlacing is used. As will be seen, even with this interlacing and the disabling of the Doppler transducer, there is uninterrupted simultaneous operation from the operator's standpoint.

The B-scan pulses are given priority over the Doppler pulses; the Doppler pulses are interrupted when a B-scan is needed during the simultaneous operation of the transducers. As will be seen, in one embodiment a predictor circuit is used which predicts the waveform of the audio signal developed from the Doppler returns.

Referring now to FIG. 10, during the simultaneous operation of the B-scan and Doppler transducers, as mentioned the Doppler transducer transmits and receives signals much more frequently than the B-scan transducer. The pulse generator 126 receives the 10 KHz signal and causes the transducer 17 to transmit pulses at this rate. The returns from the transducer 17 are coupled to a receiver and mixer 99. The frequency shift of the echo from the 3 MHz transmitter pulse is detected and provides the Doppler data. In the presently preferred embodiment, the receiver and mixer 99 provides two channels of output data (quadrature channels 1 and 2). Two channels are needed to determine the direction of the frequency shift which corresponds to the direction of the blood flow. Receiver and mixer 99 operate in a similar manner to a single-sideband detector.

The audio signal on line 132 (channel 1) and the corresponding audio signal for channel 2 are used to provide the final audio signal. An additional 90 degree phase shift is introduced between these signals, then the sum and difference of these two signals are obtained to provide a "stereophonic" sound to the operator. If one signal leads the other, then an audio output signal is provided in one speaker; whereas, if the one channel lags the other, an output is provided in the other speaker. From this, the operator is immediately able to sense the difference in flow direction. Also in the presently preferred embodiment, Fast Fourier transforms of these audio signals are used to provide additional data on the characteristics of the blood flow.

The trigger pulses for the B-scan transducer which are developed from the encoding disc 57 of FIG. 3 are coupled on line 90 to a pulse generator and delay means 91. The signal on line 90 effectively requests a B-scan pulse of the pulse generator 125. However, a B-scan does not occur until the pulse generator 125 receives an enable signal on line 130. The signal on line 120 is coupled on line 129 to the enable/disable means of the Doppler pulse generator 126. Upon the next occurrence of the 10 KHz signal, the enable/disable means 128 provides an enable signal on line 130 the generator 125. This means also disables the transmission of a sound pulse by the transducer 17. Thus, effectively the B-scan pulses become synchronized to the 10 KHz signal and in lieu of transmitting a Doppler pulse, a B-scan puls occurs. In this manner, the operation of the transduce is interlaced. As will be discussed in conjunction wit FIG. 11, only a single Doppler pulse is dropped fo each B-scan request.

The enable/disable means 128 couples a disable signa to an AND gate 127. This signal occurs simultaneousl with the enable signal. The range gate signal is als coupled to the input of this AND gate. (This range gat signal is the electrical "window" which determine when echoes received by transducer 17 are valid. Thi signal, of course, is a fuction of the depth from whic echoes are to be received and is set by moving a signa on line 131 to a sample-and-hold means 140. When th output of the AND gate 127 is high, the sample-anc hold means 140 repeats the previous sample. Thu when the output of the AND gate is high, the outpu from the receiver and mixer is ignored.

Referring now to FIG. 11, the waveform for a typic audio signal as would appear on line 133, is show Assume that at a point in time slightly before line 123, signal is received on line 90. At time 123, normall another Doppler pulse would occur. However, th Doppler pulse does not occur, but rather a B-scan pul occurs. Since a signal is present on line 131, the outpu on line 133 becomes the previous sample. That is, t level of the signal occurring prior to time 123 is r peated at time 123, as shown in FIG. 11. At time 124, regular Doppler signal is processed. Note that, shown by FIG. 11, a continuous audio signal is pr vided, even though a Doppler pulse is omitted.

An alternate embodiment to the circuit of FIG. 10 shown in FIG. 12. In this embodiment, the B-scan ar Doppler pulses occur in a true asynchronous mann with a circuit to the right of the exclusive OR gate generating a predicted audio signal to compensate f lost Doppler data. For purposes of this Specificatic the term "predictive" is used to denote the generati of anticipated Doppler data during an unobservat interval based on preceding known data.

If a B-scan pulse request is received just after a Dc pler transmission, it is necessary to delay the B-sc transmission long enough to collect the Doppler data maximum of 100 micro sec. is required for the depth field used). Delay of the B-scan transmission does noticeably affect the display. Then, the Doppler pu are inhibited for long enough to allow a B-scan tra mission and reception. In actual practice, B-scan requ signals precede the actual triggering of the B-scan tra ducer by approximately 100 micro sec. and therefor is not necessary to selectively delay the triggerin transducer 16. On the other hand, with this arrangem it is necessary to disable the Doppler transducer fo least 200 micro sec. (250 micro sec. is used).

Assume that during simultaneous Doppler and B-s operation, a pulse is received on line 90 (FIG. 12); pulse is coupled to the one-shots 92 and 93. Immediat two high signals are applied to the OR gate 94. On these signals disables the pulse generator 98, and t prevents any additional Doppler pulses for a perioc 250 micro sec. The conditions of the exclusive OR g 94 are not met during the first 100 micro sec. period thus the receiver and mixer 99 are not disabled. 1 allows the receiver to sense any returns from transr sions by transducer 17 that occured prior to the time pulse was received on line 90. After a 100 micro period, the output of the one shot 93 drops, and conditions of gate 94 are satisfied. This causes a h signal at the output of gate 94, disabling the receiver and mixer 99. At approximately this time, the delay of the pulse generator and delay 91 ends and a B-scan pulse from transducer 16 is transmitted.

The output of the gate 94 controls two switches, switch 96 and switch 97. The position of the switches indicated in FIG. 12 is for the non-predictive mode, that is, the mode when there is no interlacing of the B-scan and Doppler signals. During this mode, the output from channel 1 is coupled through switch 96 to the sample and hold means of 106. The output of the sample and hold means 106 is coupled directly to line 120 through switch 97. No processing is performed on this signal except for the sampling and delay caused by the sample and hold means 106. When the Doppler signals are interrupted, the output of the NOR gate 94 is high and switch 96 couples line 117 to the sample and hold 106 while the switch 97 couples line 120 to line 116.

The predictor circuit includes sample-and-hold means 106, 107 and 109. The output of the means 106, line 115, is coupled to the input of means 107 and is labeled "B" for purposes of discussion. The output of means 107 is labeled "A" for purposes of discussion and is coupled to one input terminal of unit 108. The other input to unit 108 is "B", line 115. The unit 108 multiplies the signal on line 115 by two and subtracts "A" from the result. Thus, the output on line 116 is 2B-A. Ordinary commercial parts are used in the predictor circuit.

The timing for the sample-and-hold means 106, 107 and 109 is provided by the 10 KHz pulse rate used by the Doppler transducer. This signal directly drives the means 109. The signal is delayed by delay means 111 to drive the sample-and-hold means 107. The output of means 111 after an additional delay by delay means 110 drives the sample-and-hold means 106. The delay means 110 and 111 assure transfer of the samples from one sample and hold means to the other to provide the signal 2B-A on line 116.

Referring now to FIG. 13, assume that the audio signal shown therein to the left of line 100 is being coupled to line 120. This corresponds to the signal on channel 1 after the signal is sampled by sample-and-hold means 106. Next assume that it is necessary to interlace a B-scan pulse. The output of NOR gate 94 goes high and switches 96 and 97 switch to the opposite positions from that shown. At this time, the output of the sample-and-hold means 107 is "A", the sample to the immediate left of line 100 of FIG. 13. The output on line 116 is 2B-A which is coupled to line 120. As can be seen from FIG. 13, 2B-A continues the audio waveform in the same direction (downward) and at the same general slope as that occurring before line 100. The 2B-A signal is coupled to the sample-and-hold means 109 and provides the next input to the sample-and-hold means 106. Thus the outputs from the unit 116 continue as indicated by the next output 122 of FIG. 11. These "predicted" Doppler outputs continue until the signal at the output of gate 94 drops in potential and true Doppler data is coupled to means 106 from the receiver and mixer 99.

The above predictor circuit provides a relatively simple linear prediction. It will be obvious to one skilled in the art that more complicated algorithms may be used to predict the audio waveform of FIG. 13 during the periods that true Doppler returns are interrupted.

In the above-described alternate embodiment, the Doppler transducer is interrupted for fixed periods. The above system assumes that a Doppler pulse has just been transmitted when a request for a B-scan pulse is received on line 90. By tracking the actual time when a Doppler pulse is transmitted, the time during which the Doppler transducer is disabled can be reduced. For example, if a Doppler pulse has been transmitted 90 micro sec. before the request for a B-scan transmission a B-scan transmission can occur in 10 micro sec. rather than waiting for the full 100 micro sec.

Thus, an ultrasound imaging head has been described which uses two transducers to provide simultaneous B-scan display and Doppler data. From the operator's standpoint, both the B-scan and Doppler data are continuous. The B-scan and Doppler pulses are interlaced to provide this simultaneous operation. In the alternate embodiment, predictor circuit provides predicted Doppler (audio) signals.

We claim:

1. An ultrasound imaging apparatus comprising:
a hand-holdable housing;
a fluid chamber formed within said housing, one portion of said chamber being defined by a flexible membrane;
a first transducer mounted for oscillatory movement in a first plane within said fluid chamber to provide a B-scan display, said first transducer mounted such that its field of view passes through said membrane;
a second transducer for providing Doppler data mounted within said fluid chamber such that its beam moves within said first plane;
positioning means coupled to said second transducer for positioning said beam of said second transducer in said first plane; and
circuit means for interlacing ultrasound pulses from said first and second transducers to provide an updated B-scan display and Doppler data, said circuit means including means for interrupting transmissions by one of said transducers to enable transmission and reception by said other transducer;
whereby continuous B-scan and Doppler data are provided.

2. The apparatus defined by claim 1 wherein said positioning means is a manual means.

3. The apparatus defined by claim 2 wherein said positioning means includes a wheel disposed on said housing for changing the angular position of said second transducer in said first plane.

4. The apparatus defined by claim 3 wherein said positioning means includes a wire interconnecting said wheel with said second transducer so as to provide mechanical coupling between said wheel and said second transducer.

5. The apparatus defined by claim 4 wherein said positioning means includes a guide tube frame for receiving said wire, said frame enabling said wire to be tensioned prior to the time that said wheel, frame and wire are mounted within said housing.

6. The apparatus defined by claim 1 wherein said fluid chamber is filled with a fluid having an acoustic velocity approximately equal to the acoustic velocity of human tissue.

7. The apparatus defined by claim 6 wherein said membrane has an acoustical impedance approximately equal to the acoustical impedance of human tissue.

8. The apparatus defined by claim 7 wherein said membrane is silicone rubber embedded with iron oxide.

9. An ultrasound imaging apparatus comprising;

a hand-holdable housing, said housing including a fluid chamber;

a flexible boot defining a portion of said fluid chamber;

a first transducer mounted within said fluid chamber for oscillatory motion;

a second transducer for providing Doppler data mounted within said fluid chamber for pivotal movement;

said first and second transducers being mounted for their respective oscillatory and pivotal movement such that their fields of view are coplanar;

manual adjustment means for adjusting the angular position of said second transducer; and, circuit means for permitting interlaced operation of said first and second transducer, said circuit means including means for interrupting transmissions by said second transducer to enable transmission and reception by said first transducer, and thereby give priority to said B-scan display;

whereby accurate B-scan and Doppler data are simultaneously provided.

10. The apparatus defined by claim 9 including a motor for driving said first transducer in said oscillatory motion.

11. The apparatus defined by claim 10 including an encoding disc mounted for rotation with said motor for providing position information on said first transducer.

12. The apparatus defined by claim 11 including sinusoidally distributed codes on said encoding disc which are sensed for triggering said first transducer, such that beams from said first transducer are uniformly, spacially separated.

13. The apparatus defined by claim 9 wherein said manual adjustment means includes a wheel disposed on said housing for changing the angular position of said second transducer in said first plane.

14. The apparatus defined by claim 13 wherein said manual adjustment means includes a wire interconnecting said wheel with said second transducer so as to provide mechanical coupling between said wheel and said second transducer.

15. The apparatus defined by claim 14 wherein said manual adjustment means includes a guide tube frame for receiving said wire, said frame enabling said wire to be tensioned prior to the time that said wheel, frame and wire are mounted within said housing.

16. An ultrasound imaging apparatus comprising:

a first and second transducer mounted for coplanar movement within a fluid chamber;

said first transducer for providing a B-scan and said second transducer for providing D data;

first circuit means for asynchronously trigger first and second transducers, coupled to sa ducer;

second circuit means for interrupting trans from said second transducer when said fir ducer is triggered, coupled to said first means;

third circuit means for providing a signal re ing a continued Doppler signal during sai ruption of transmission from said secon ducer, coupled to said second transducer a second circuit means;

whereby continuous B-scan and Doppler d provided.

17. The apparatus defined by claim 16 wher third circuit means stores samples of signals re ing said Doppler waveform and predicts said I waveform based on said samples.

18. The apparatus defined by claim 17 wher third circuit implements a linear predictor.

19. An ultrasound imaging apparatus compri a hand-holdable housing, said housing incl fluid chamber;

a flexible boot defining a portion of said flui ber;

a first transducer mounted within said fluid c for oscillatory motion;

a second transducer for providing Doppl mounted within said fluid chamber for movement;

said first and second transducers being mou their respective oscillatory and pivotal mo such that their fields of view are coplanar manual adjustment means for adjusting the position of said second transducer, said adjustment means including a guide tube fi receiving a wire, said wire interconnect second transducer with a rotatable wheel housing, said frame enabling said wire to sioned prior to the assembly of said appar whereby an ultrasound imaging apparatus is 20. The apparatus as defined by claim 19 fu cluding circuit means for permitting interlace tion of said first and second transducer; includin for interrupting transmission by said second tr to enable transmission and reception by said fi ducer, and thereby give priority to said B-scan 21. The apparatus defined by claim 19 inc predictor circuit for providing a predicted signal during said interruption of said secon ducer.

* * * * *